United States Patent
Wu

(10) Patent No.: US 9,254,509 B2
(45) Date of Patent: Feb. 9, 2016

(54) ACTIVE CLEANING DEVICE FOR SEISMIC STREAMERS AND RELATED METHODS

(75) Inventor: Zhaohong Wu, Katy, TX (US)

(73) Assignee: CGGVERITAS SERVICES SA, Massy (FR)

( * ) Notice: Subject to any disclaimer, the term of this patent is extended or adjusted under 35 U.S.C. 154(b) by 966 days.

(21) Appl. No.: 13/440,349

(22) Filed: Apr. 5, 2012

(65) Prior Publication Data
US 2013/0265850 A1   Oct. 10, 2013

(51) Int. Cl.
- *G01V 1/38* (2006.01)
- *B08B 7/00* (2006.01)
- *B08B 9/023* (2006.01)
- *B08B 1/00* (2006.01)

(52) U.S. Cl.
CPC ............ *B08B 1/008* (2013.01); *B08B 9/023* (2013.01); *G01V 1/38* (2013.01)

(58) Field of Classification Search
CPC ........... G01V 1/38; B08B 9/023; B08B 1/008
USPC ................ 15/1.7, 93.1; 134/9; 367/15, 20
See application file for complete search history.

(56) References Cited

U.S. PATENT DOCUMENTS

| | | | |
|---|---|---|---|
| 4,086,025 A * | 4/1978 | Astrand | 416/142 |
| 5,329,071 A * | 7/1994 | Vatne et al. | 181/110 |
| 5,404,339 A * | 4/1995 | Cole, Jr. | 367/16 |
| 5,894,450 A | 4/1999 | Schmidt et al. | |
| 6,026,056 A | 2/2000 | Lunde et al. | |
| 6,357,813 B1 * | 3/2002 | Vandeberghe et al. | 296/57.1 |
| 7,145,833 B1 | 12/2006 | Hoogeveen | |
| 7,409,919 B2 | 8/2008 | Hoogeveen et al. | |
| 7,610,871 B2 | 11/2009 | Leclercq et al. | |
| 7,754,018 B2 | 7/2010 | Lepage et al. | |
| 8,267,031 B2 * | 9/2012 | Austad et al. | 114/244 |
| 8,806,692 B2 * | 8/2014 | Zhang | H02G 7/16 15/93.1 |
| 8,875,722 B2 * | 11/2014 | Karlsen et al. | 134/141 |
| 2006/0176774 A1 | 8/2006 | Toennessen | |
| 2006/0227658 A1 | 10/2006 | Toennessen et al. | |
| 2010/0254216 A1 | 10/2010 | Toennessen | |

FOREIGN PATENT DOCUMENTS

GB        1010717   * 11/1965

* cited by examiner

*Primary Examiner* — Daniel L Murphy

(74) *Attorney, Agent, or Firm* — Patent Portfolio Builders PLLC

(57) ABSTRACT

A cleaning device for cleaning a marine streamer towed underwater and related methods are provided. The cleaning device includes a housing configured to be attached to the streamer, a motor mounted inside the housing, a propeller configured be rotated by the motor and to drive the housing along and relative to the streamer in a towing direction, and a controller configured to control the motor and the propeller.

20 Claims, 9 Drawing Sheets

Cross-section A-A'

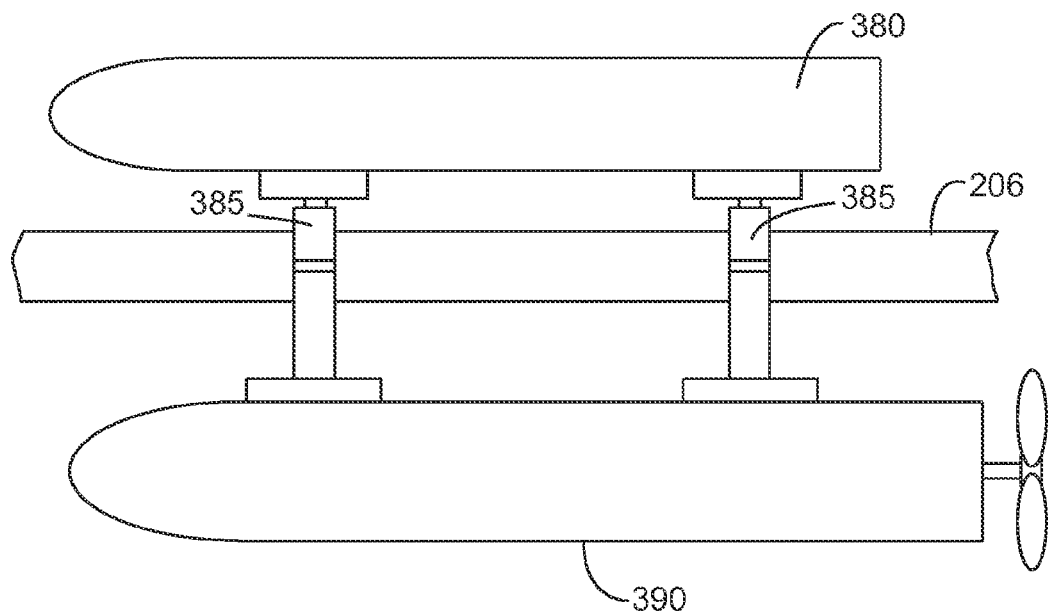

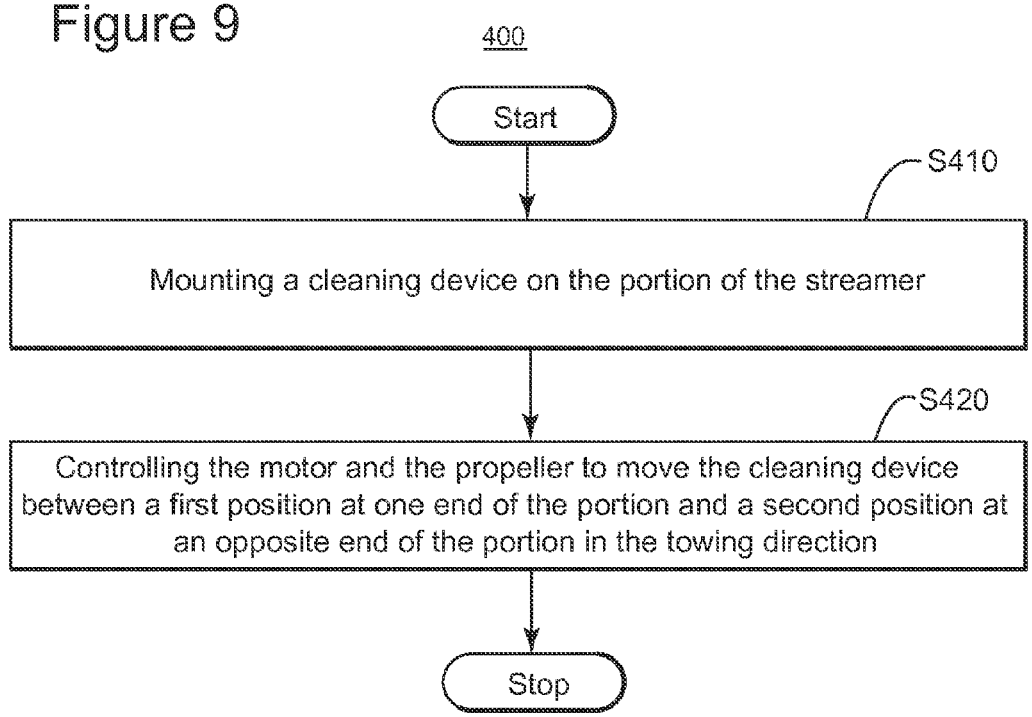

ACTIVE CLEANING DEVICE FOR SEISMIC STREAMERS AND RELATED METHODS

BACKGROUND

1. Technical Field

Embodiments of the subject matter disclosed herein generally relate to cleaning devices for streamers used in marine seismic surveying and, more particularly, to autonomous cleaning devices and related methods for cleaning marine growth and other contaminants deposited on the streamers towed underwater.

2. Discussion of the Background

Marine seismic surveying investigates and maps the structure and character of geological formations under a body of water using reflection seismology. Reflection seismology is a method of geophysical exploration especially helpful in the oil and gas industry. In marine reflection seismology, the depth and the horizontal location of features causing reflections of seismic waves are evaluated by measuring the time it takes for the seismic wave to travel to receivers. These features may be associated with subterranean hydrocarbon reservoirs.

A typical marine seismic surveying system is illustrated in FIG. 1. A vessel 100 tows a seismic source 102 and plural streamers such as 106, each streamer carrying an array of seismic receivers 104 (e.g., hydrophones). It is desirable to maintain the streamers at predetermined horizontal cross-line distances (i.e., along an axis perpendicular to the towing direction T), and at predetermined depths (e.g., 10 m) relative to the water surface 108. The seismic source 102 is configured to generate a seismic wave 110 that propagates downward (down, up and vertical being defined relative to gravity) toward the seafloor 120 and penetrates the formations 125 under the seafloor 120 until it is eventually reflected at discontinuity locations such as 122a and 122b. The reflected seismic waves 130a and 130b propagate upwardly and can be detected by one of the receivers 104 on the streamer 106. Based on the data collected by the receivers 104, an image of the subsurface formation is generated by further analyses of the collected data.

To maintain the streamers at a desired position (i.e., such as to have predetermined cross-line distances and predetermined depths), conventionally, a horizontal position control device 140 is attached to the streamer, most frequently at the front of the streamer 106, close to the towing vessel 100. Separate conventional depth control devices 145 (e.g., floaters) may be employed to maintain a depth of the streamer.

Streamer Rescue Devices (SRDs) 150, which are configured to help recover portions of streamers that have been accidentally severed, are placed typically at regular intervals along the streamers (e.g., every 300 m for a streamer of about 12 km). An SRD is activated to generate signals when the respective portion of the streamer sinks below a predetermined depth (e.g., 48 m) and/or pressure increases above a predetermined level (e.g., 70 psi).

Significant amounts of bio-fouling settlement accumulate on the exterior surface of the streamers. These accumulations can obscure the reflected seismic wave and significantly increase the streamer drag. The rate of accumulation and the impact of the bio-fouling and other contaminants depend on factors, among others, such as the geographic location, the water temperature, and the season. The gooseneck barnacle is the most common bio-fouling organism found on the marine streamers.

Cleaning such contaminants from the exterior of the streamers is desirable and beneficial. For example, a cleaning device 160 with brushes or other cleaning tools may be moved along the streamer to clean contaminants from the exterior thereof.

A conventional cleaning device, such as the one disclosed in U.S. Pat. No. 7,754,018, typically includes one or more cleaning elements (e.g., brushes) and a mechanism configured to attach and to roll the cleaning device along the streamer in order to clean the exterior of thereof. The cleaning device may include buoyant bodies. The frame of the cleaning device may be designed to pass over the SRDs and the depth control devices while moving along the streamer (e.g., the frame may have a center clearance).

A conventional cleaning device 165 described in U.S. Pat. No. 7,145,833 and illustrated in FIG. 2 has two vanes (e.g., 170a and 170b) attached to a cylindrical body 175 formed by two half cylinders 177 engaged on one side by hinges 179 and on another by any suitable releasable fastener (not shown). Brushes 180 are attached inside the body 175 via inserts 185 to reach the outer surface of the streamer 106. The vanes are angled with respect to longitudinal axis of the body 175 to provide both thrust and torque to the body 175.

Most conventional cleaning devices are passive devices that are moved relative to the streamer by the water flow. They are deployed at the front of the streamer (i.e., close to the towing vessel) and picked up at the end of the streamer, after a cleaning operation along the streamer. The cleaning devices are then manually repositioned for another cleaning operation along the same streamer or another streamer. Human intervention in retrieving and repositioning the cleaning devices is a source of inefficiency and renders the cleaning of the streamer expensive.

An active cleaning device is described in U.S. Pat. No. 7,409,919. This cleaning device includes a turbine rotated by the water flow caused by the movement of the streamer through the water, and a drive element configured to convert the rotation of the turbine into motion of the cleaning device along the seismic streamer. The drive element includes wheels or other mechanisms that are in contact with and moving relative to the streamer. In order to reverse the motion from upstream (i.e., in the towing direction) to downstream (i.e., in a direction opposite to the towing direction) the pitch of the turbine blades is changed. This cleaning device has the disadvantage that the turbine and the drive train to wheels can be damaged by seaweed or fish line entangled on the moving parts dragged through the water. Additionally, since the drive elements are constantly in tight frictional contact (e.g., loaded by spring suspension) with the streamer, it may at times be difficult for the cleaning device to roll over the contaminants deposited on the streamer's outer surface, and it occasionally may be even impossible to pass obstacles with larger diameter, such as, weights or bird collar overmolds that are often seen along streamer sections.

In recent years, new positioning devices for streamers (named "birds") have been developed. The birds are inserted between streamer section ends, along the streamer and are able to develop forces to adjust both a depth and a horizontal location. For example, U.S. Pat. No. 7,610,871 discloses a bird having three fins attached to an outer shell of the bird's body. The fins are mounted to individually rotate around their respective transverse (i.e., perpendicular to the towing direction) axes of rotation. One fin, which normally has its rotation axis along gravity, is free to rotate and is ballasted or linked to a ballast, performing a roll and/or orientation stabilization of the bird while in motion. The other two fins are controlled to rotate around a respective rotation axis at individual rotation angles, so as to develop desired horizontal and vertical forces while dragged through the water, steering the bird toward an intended position of the streamer.

While being superior to older positioning devices for streamers, these birds are sometime also bulkier. The conventional cleaning devices are rendered obsolete, because the birds are too large for the cleaning devices to pass over them. Therefore, there is a need to develop cleaning devices for streamers designed to operate when birds or other obstacles are present on the streamers.

BRIEF SUMMARY OF THE INVENTION

The recently developed streamer positioning devices (birds) have rendered the conventional streamer cleaning devices obsolete, because it became impractical or impossible to pass over the birds. Cleaning devices and related methods according to various embodiments provide an efficient streamer cleaning solution, being designed to clean portions of the streamers between neighboring birds and to remain mounted on these streamer portions when not actively used. The cleaning device may be internally integrated or externally coupled to a streamer rescue device (SRD) to avoid having the cleaning device passing an SRD between two adjacent birds. The cleaning devices are designed to be able to operate autonomously, without requiring human intervention on a regular basis.

According to an exemplary embodiment, a cleaning device for cleaning marine streamers towed underwater is provided. The cleaning device includes a housing configured to be attached to the streamer, a battery powered motor mounted inside the housing, a propeller configured to be rotated by the motor and to drive the housing along and relative to the streamer in a towing direction, and a controller configured to control the motor and the propeller.

According to another embodiment, a streamer towed underwater to perform a marine seismic surveying includes a cable-like structure, positioning devices, and one or more cleaning devices attached to the cable-like structure and configured to clean a portion thereof, between neighboring positioning devices. The cable-like structure hosts seismic sensors. The positioning devices are configured to adjust depth and horizontal position of the cable-like structure and are mounted at different locations on the cable-like structure. Each cleaning device is attached to the cable-like structure and configured each to clean a respective portion of the cable-like structure, between neighboring positioning devices. At least one cleaning device has (A) a housing attached to the cable-like structure via at least one of brush rings, clamp rings and press wheels, (B) a propeller and (C) a motor configured to drive the housing along and relative to the streamer in a towing direction.

According to another exemplary embodiment a method for cleaning a portion of a streamer is provided. The method includes mounting a cleaning device on the portion of the streamer. The cleaning device has (A) a housing configured to be attached to the streamer via a mechanism including at least one of brush rings, clamp rings and press wheels and to clean the exterior of the streamer when moving along thereof, (B) a motor mounted inside the housing, and (C) a propeller connected to be rotated by the motor and sealed outside the housing, the propeller being configured to drive the housing along and relative to the streamer in a towing direction. The method further includes controlling the motor and the propeller to move the cleaning device between a first position at one end of the portion and a second position at an opposite end of the portion in the towing direction

BRIEF DESCRIPTION OF THE DRAWINGS

For a more complete understanding of the present invention, reference is now made to the following descriptions taken in conjunction with the accompanying drawings, in which:

FIG. 8 is a schematic diagram of a cleaning device according to another exemplary embodiment; and FIG. 9 is a flowchart of a method for cleaning the exterior of a portion of a streamer according to another exemplary embodiment.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a cleaning device for streamers used in marine seismic surveying. However, the embodiments to be discussed next are not limited to operating on streamers used in marine seismic surveying, but may be applied to cleaning portions of other cable-like structures.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Cleaning devices, according to various embodiments described below, facilitate maintaining free of bio-fouling and other contaminants streamer portions between obstacles that are too large to be passed over. A streamer may have plural cleaning devices positioned to clean at least the portions of the streamer having a high rate of accumulation of bio-fouling and other contaminants. Cleaning devices may be mounted on all the portions of the streamers. These cleaning devices remain attached to the streamer portions when not used for a cleaning operation. The overall cost of having plural cleaning devices is mitigated by reduced operating cost for manual barnacle cleaning, and by using cleaning devices only at sections that are hard to reach and have stronger barnacle growth (e.g., the front most sections in each streamer).

Figure 1:
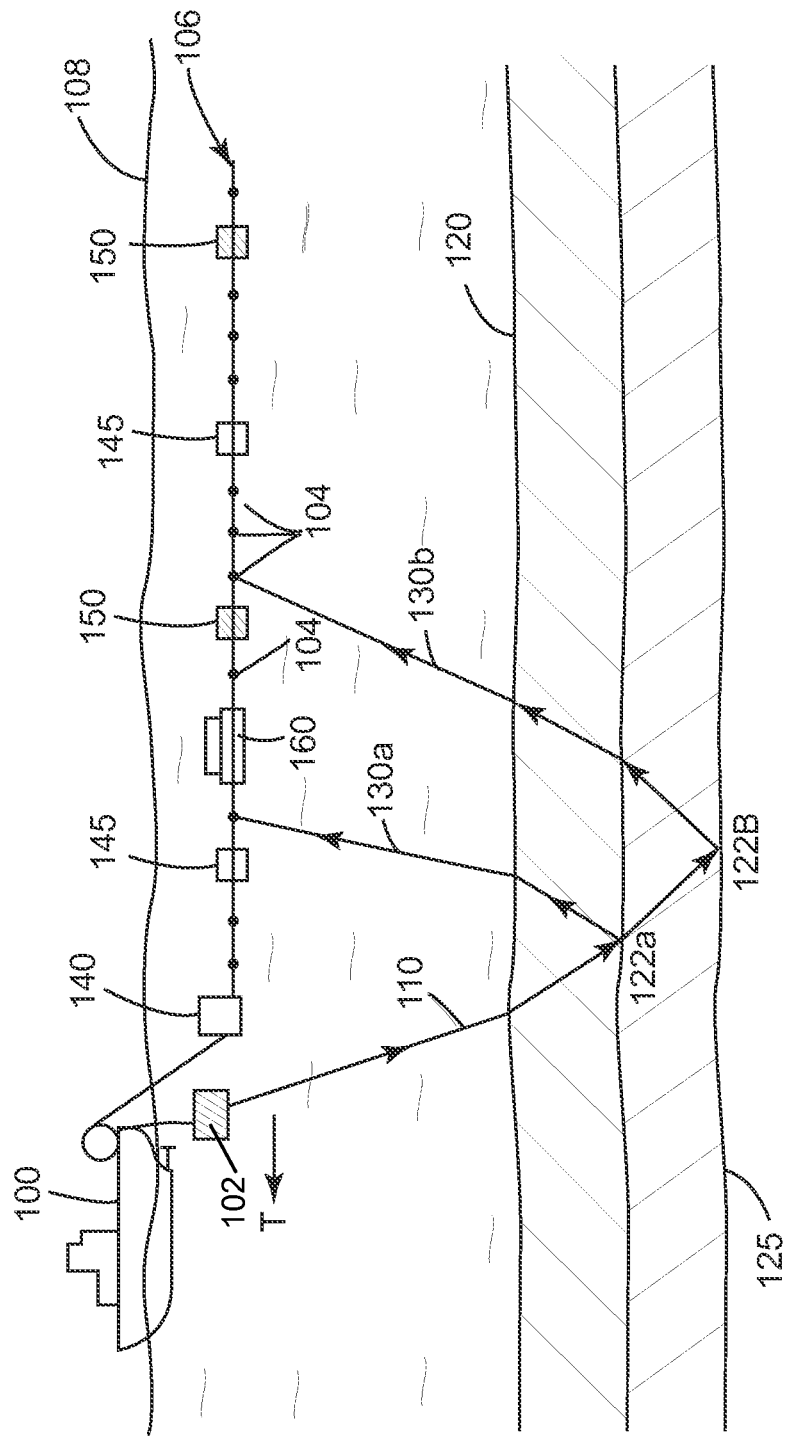
FIG. 1 is a schematic diagram of a typical marine seismic surveying system.
Figure 2:
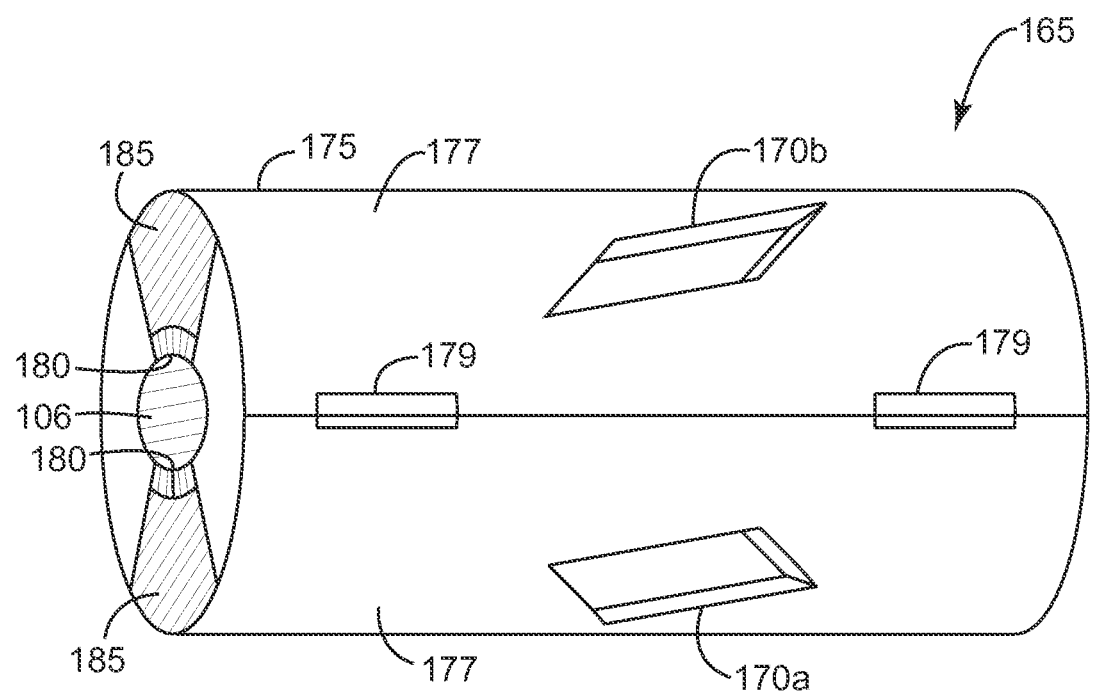
FIG. 2 illustrates a conventional streamer cleaning device.
Figure 3:
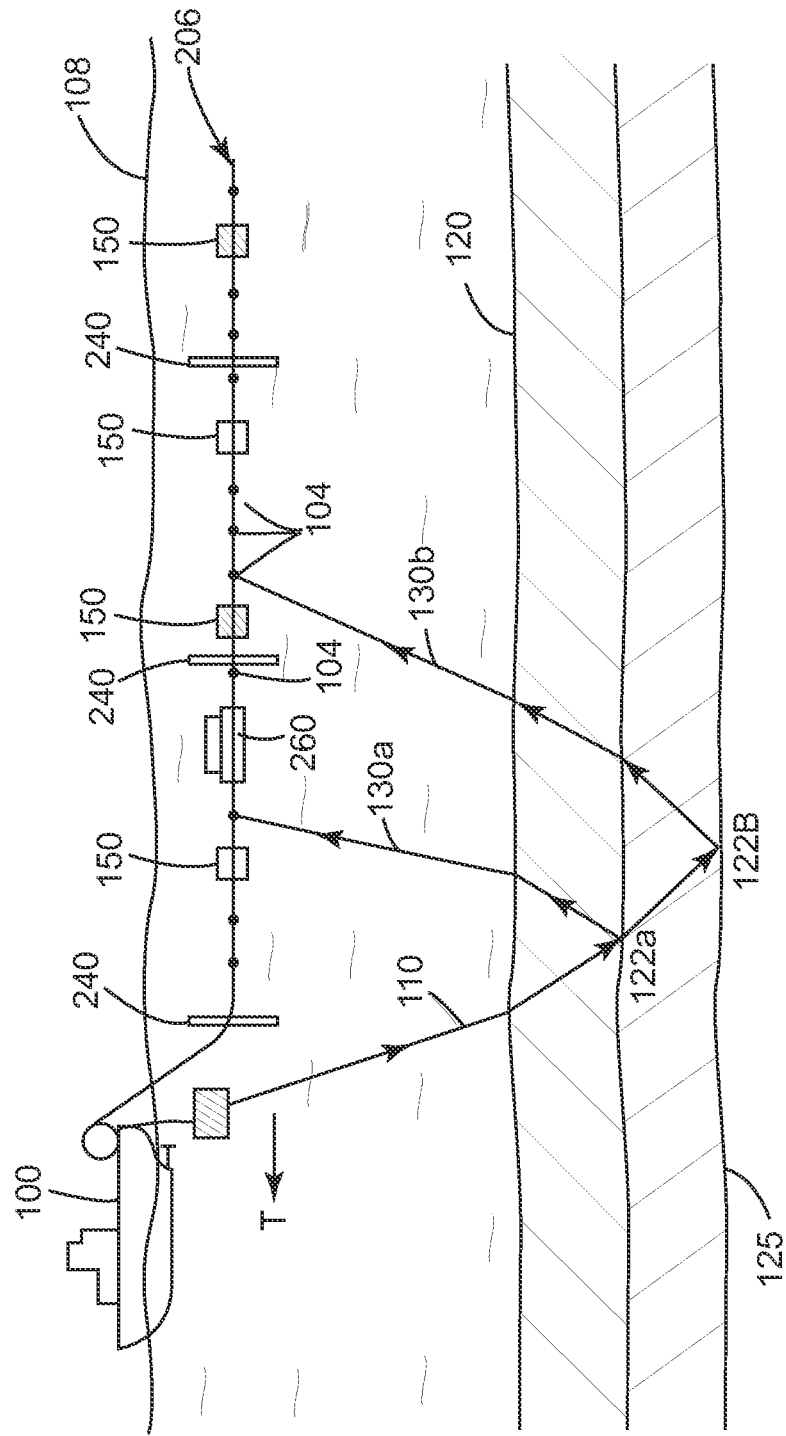
FIG. 3 is a schematic diagram of a marine seismic surveying system according to one embodiment.

According to an exemplary embodiment illustrated in FIG. 3, plural streamers such as 206 are towed by a vessel 100 that also tows a seismic source 102. The streamer includes a cable-like structure 206 carrying an array of seismic receivers 104 (e.g., hydrophones). During data acquisition, it is desirable that the plural streamers towed underwater have predetermined cross-line distances (i.e., along an axis perpendicular to the towing direction T), and predetermined depths (e.g., 10 m) relative to the water surface 108.

In order to maintain the streamers in the desired arrangement, streamer, position control devices 240 ("birds") able to adjust both the depth and the horizontal position are mounted at different locations along the cable-like structure 206. Streamer Rescue Devices (SRDs) 150 configured to help recovering portions of streamers that have been accidentally severed, are also placed at regular intervals along the streamers.

One or more cleaning devices 260 may be attached to the streamer 206. Each cleaning device 260 is configured to clean a portion of the streamer between neighboring obstacles, such as the streamer position control devices 240, by moving upstream and downstream (in the towing direction T and in a direction opposite to the towing direction) along the respective portion of the streamer 206.

Figure 4:
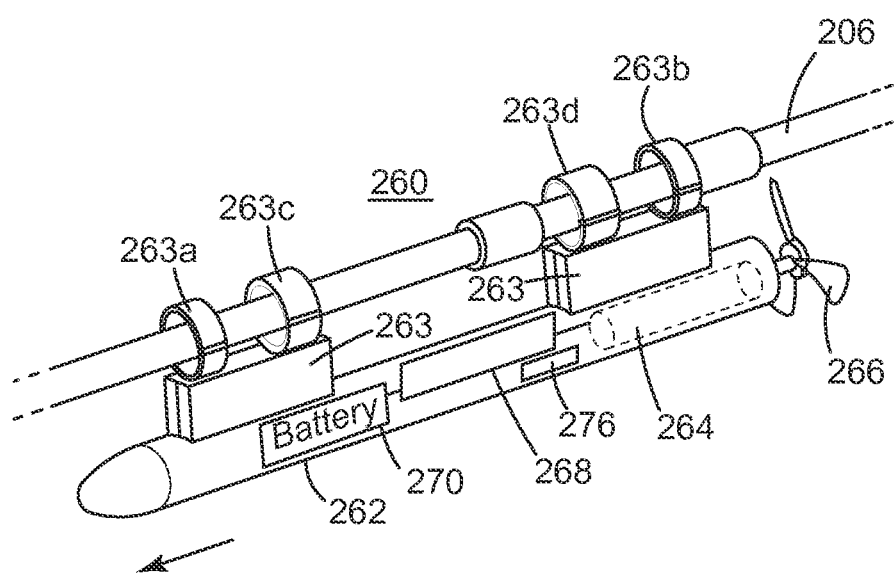
FIG. 4 is a schematic diagram of a cleaning device according to an exemplary embodiment.

A schematic diagram of the cleaning device 260 is illustrated in FIG. 4. The cleaning device 260 has a housing 262 configured to be attached to the streamer 206. The housing 262 is attached to the streamer 206 via a mechanism 263. The mechanism 263 includes contaminant-removing elements, such as, brush rings, clamp rings and press wheels or a combination of these. The mechanism 263 illustrated in FIG. 4 includes a pair of brush rings 263a and 263b, and a pair of clamp rings 263c and 263d. The number, type and arrangement of these contaminant-removing elements are merely illustrative and the illustrated embodiment is not intended to be limiting. For example, one embodiment may have no wheels in contact with the streamer. The contaminant-removing elements in contact to the streamer are not drive elements employed to move the housing along the streamer.

Figure 5A:
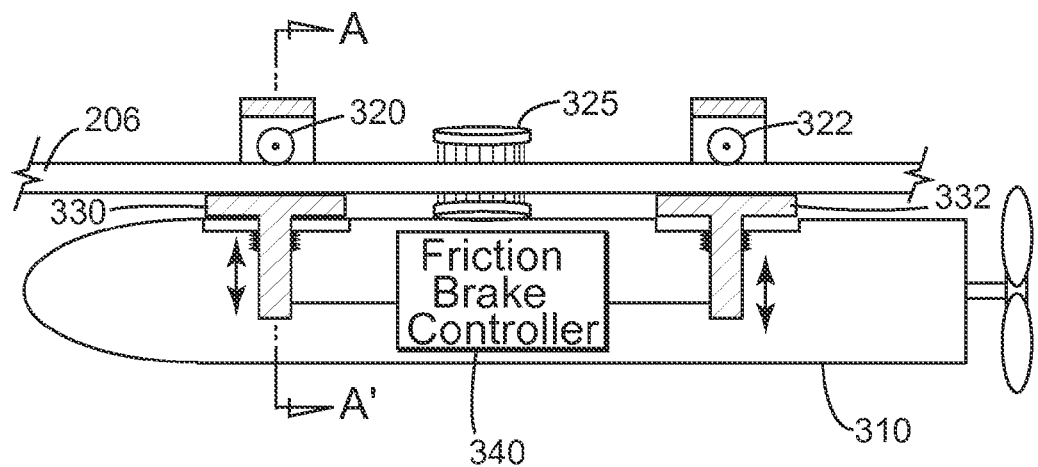
FIGS. 5A-B are schematic diagrams of a cleaning device according to another exemplary embodiment.
Figure 5B:
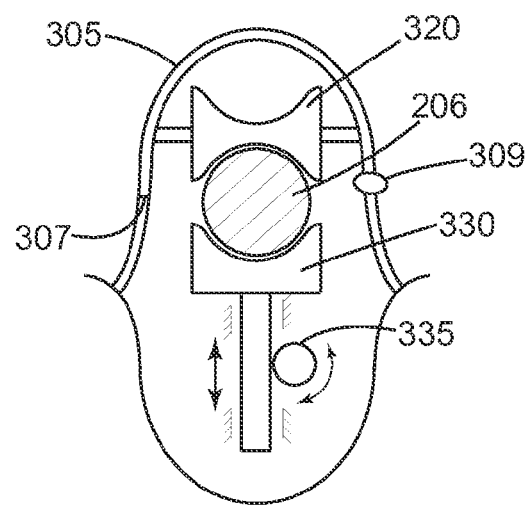

The cleaning device's buoyancy is ideally neutral, but in practice may be in a range of +/−1 kgf. In another embodiment illustrated in FIGS. 5A and 5B, the housing 310 is attached to the streamer 206 via wheels 320 and 322 allowing the housing to easily travel along the streamer 206. A brush 325 for cleaning barnacle is also carried between wheels 320 and 322. Opposite to the wheels 320 and 322 relative to the streamer 206, there are corresponding brake pads 330 and 332 having a surface profile matching streamer profile (as shown in FIG. 5B) for maximizing a friction engaging area. The brake pads 330 and 332 may be linearly actuated by an actuating mechanism 335 controller by a friction brake controller 340. For example, the actuating mechanism may include a worm gear. The cleaning device may be attached to the streamer 206 by opening an upper frame 305 having a hinge 307 and a resealable fastener 309.

Returning now to FIG. 4, a motor 264 mounted inside the housing 262 is configured to rotate a propeller 266 mounted outside the housing 262. The motor 264 may be a lightweight permanent magnet DC motor or a brushless AC motor. The propeller 266 is configured to actively drive the housing 262 upstream along and relative to the streamer 206, in the towing direction T. The housing 262 may be moved downstream (contrary to the towing direction) passively due only to the water flow, may be moved due to the water flow but controlled using the propeller 266 and the motor 264 or may be moved by the propeller 266 and the motor 264. In order to reverse direction of the motion of the housing along the streamer when only the propeller 266 and the motor 264 are used, a controller 268 switches the propeller's rotation to opposite direction.

In order to enable the controller 268 to properly set the propeller's rotation direction and/or speed, a sensor 276, such as, a proximity sensor or a mechanical touch sensor, provides the controller 268 signals when the cleaning device 260 reaches one or the other end of the cleaned streamer portion. In other embodiments, instead of the sensor 276, the cleaning device includes a transmitter connected to the controller and configured to communicate with surrounding devices (e.g., birds, SRDs, etc) to enable the controller to determine the position of the cleaning device.

In one embodiment, a gear reduction may be incorporated in order to be able to use a larger and more efficient propeller. In another embodiment, alternatively, a slow high-torque motor may be used to reduce energy loss and maintenance from gearing.

The controller 268 may be configured to control the motor 264 and the propeller 266 to move the housing 262 along the streamer at predetermined time intervals, upon receiving a command, or upon receiving an indication that a cleaning operation is desirable. The indication that a cleaning operation is desirable may be generated by a bio-fouling monitoring function of the cleaning device, which may be achieved by using a vision sensor overseeing barnacle growth at a relevant location (on or nearby the portion that is cleaned using the cleaning device) or a bio-sensor measuring the larvae level in water.

Figure 6A:
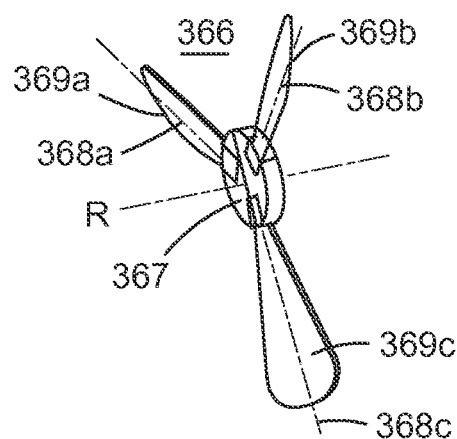
FIGS. 6A-B are schematic diagrams of a foldable propeller used in a cleaning device according to an exemplary embodiment.
Figure 6B:
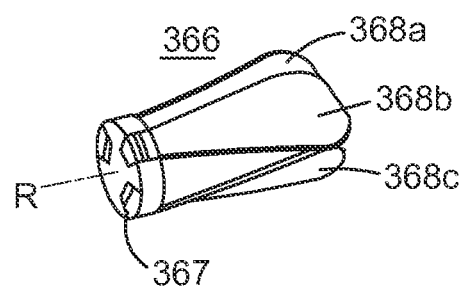

The propeller may have foldable blades. That is, as illustrated in FIG. 6A, while actively used, the propeller 366 has blades 368a, 368b, and 368c extended from the central portion 367, to have their respective blade axis 369a, 369b and 369c substantially in the same plane that is perpendicular to the central axis R of the propeller 366. While the propeller is not used, the propeller blades 368a, 368b, 368c may be folded toward the central axis R as illustrated in FIG. 6B, so that the propeller 366 has a cylindrical shape that is substantially parallel to the streamer. Having the propeller blades folded during data acquisition results in less noise, a lower drag, and a decreased risk of catching fishing lines or seaweed on the propeller blades.

In an alternative embodiment, the propeller does not have foldable blades, but it is configured to adjust the pitch angle of the blades (i.e., the angle around the respective blade axis) to minimize friction with water flow when the propeller is not used. This embodiment achieves similar benefits with one in which the propeller has foldable blades, except the risk of catching lines or seaweed is higher than when the blades are folded.

The power to operate the motor 264 may be provided by a battery 270. The battery 270 may be recharged by the water-driven propeller 266 through the motor 264 in a manner similar to the manner in which a hybrid car recharges its battery (i.e., by converting the kinetic energy into battery stored energy). A charge regulator may be included in the controller 268 to ensure (1) that the battery is charged at the maximum rate it can safely tolerate, (2) that the battery is not overcharged when nearing full charge, and/or (3) that the battery is not overheated when a large charge current becomes available. Since the cleaning device is most of the time stationary relative to the streamer (rather than being propelled using battery power), the current required for battery charging can be much lower than the current used for moving the cleaning device. Alternatively, electric power may be via the streamer through an inductive coupling for powering the motor.

Figure 7:
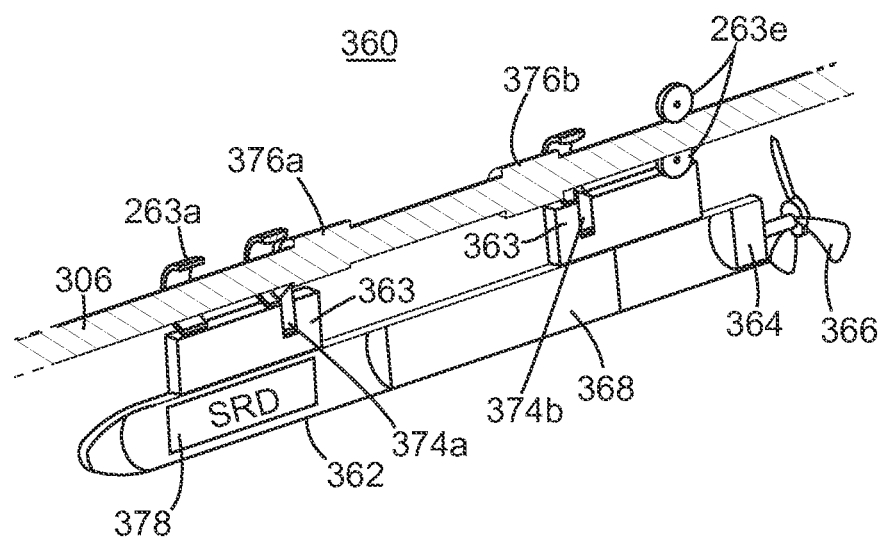
FIG. 7 is a schematic diagram of a cleaning device according to another embodiment.

The cleaning device may also include a fastening mechanism configured to affix the housing to the streamer while the cleaning device is stationary (i.e., a cleaning operation is not performed). In FIG. 7, a cleaning device 360 according to another exemplary embodiment has two latches 374a and 374b. The controller 368 is configured to actuate the latches 374a and 374b. The cable-like structure of the streamer 306 may also have portions with station stoppers 376a and 376b that have a slightly larger diameter than the rest of the streamer, and are configured to engage with the latches 374a and 374b to enhance the stability of the position of the cleaning device 360, i.e., to prevent the cleaning device from sliding along the streamer when not in operation. Note that the cleaning device 360 also has pair of pressing wheels 263e operating as contaminant-removing elements and an SRD device 378 is mounted inside the housing 362.

Frequently, an SRD is deployed for each streamer section between two birds. In one embodiment, the SRD may be embedded in the cleaning device (e.g., placed inside the housing). Alternatively, in another embodiment illustrated in FIG. 8, an SRD 380 is coupled to the housing 390 of the cleaning device via ring-type structures 385 that are clamped around the streamer cable 206. The housing 390 of the cleaning device may be attached to the ring-type structure 385 at one side (e.g., above or below) of the streamer cable 206, and the SRD 380 may be attached to the ring-type structure 385 at the opposite side of the streamer cable 206. These two embodiments allow the cleaning device travel the full cleaning range (e.g., between two adjacent birds) without having to pass over the SRD. In one embodiment, the SRD may include a compass for navigation purposes.

A flow diagram of a method 400 for cleaning an exterior of a portion of a streamer is illustrated in FIG. 9. The method 400 includes mounting a cleaning device on the portion of the streamer at S410. The mounted cleaning device has (1) a housing configured (A) to be attached to the streamer via a mechanism including contaminant-removing elements such as brush rings, clamp rings and/or press wheels, and (B) to clean the exterior of the streamer when moving along thereof, (2) a motor mounted inside the housing, and (3) a propeller connected to be rotated by the motor and sealed outside the housing, the propeller being configured to drive the housing along and relative to the streamer in a towing direction.

The method 400 further includes controlling the motor and the propeller to move the housing in the towing direction, between a first position at one end of the portion and a second position at an opposite end of the portion, at S420. At the first position and at the second position may be mounted positioning devices (birds) over which the cleaning device cannot pass. The housing may moved downstream due to the water flow only, due to the water flow but controlled via the motor and the propeller.

The propeller may have foldable blades. The method may then further include controlling the propeller to have the blades folded when the housing is stationary relative to the streamer.

The cleaning device may further include a fastening mechanism to affix the housing to the streamer when the cleaning device is stationary relative to the streamer. The method may then further include actuating the fastening mechanism.

The fastening mechanism may include two latches, and then, the step of actuating the fastening mechanism may include (1) actuating first a first latch to engage with a first station stopper on the streamer, the first station stopper being located closer to a towing vessel than a second station stopper, and (2) actuating a second latch to engage with the second station stopper.

The cleaning device may be an embodiment that further includes a battery connected to the motor and configured to provide power to the motor, and the propeller may have foldable blades. Then the method may further include (1) controlling the propeller and the motor to recharge the battery while the housing is stationary relative to the streamer if the battery is not fully charged, and (2) folding the blades of the propeller while the housing is stationary relative to the streamer if the battery is fully charged.

Thus, in contrast to the conventional cleaning devices that had to be mounted on and retrieved for the streamer, the cleaning devices according to some of the embodiments provide possibility of an autonomous manner of operation due to (1) the rechargeable battery, (2) that they remain on the streamer when not used, (3) that they may start a cleaning operation at predetermined time intervals or when an embedded bio-fouling monitoring function indicates that cleaning is desirable.

The disclosed exemplary embodiments provide a cleaning device and related methods for cleaning portions of a streamer. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A cleaning device for cleaning a marine streamer that is towed underwater, the cleaning device comprising:
   a housing configured to be attached to the marine streamer;
   a motor mounted inside the housing;
   a propeller configured to be rotated by the motor to drive the housing along and relative to the streamer in a towing direction; and
   a controller configured to control the motor and the propeller.

2. The cleaning device of claim 1, further comprising:
   a mechanism configured to attach the housing to the streamer and to clean the streamer when the housing moves along and relative to the streamer, the mechanism including one or more contaminant-removing elements selected from a group including brush rings, clamp rings and press wheels.

3. The cleaning device of claim 1, wherein the cleaning device is configured to clean a portion of the streamer by moving back and forth, in the towing direction and in a direction opposite to the towing direction along and relative to the streamer, and the housing moves relative to the streamer in the direction opposite to the towing direction due to a water flow caused by towing the streamer underwater.

4. The cleaning device of claim 1, further comprising:
a battery connected to the motor and configured to provide power to the motor.

5. The cleaning device of claim 4, wherein the controller controls the propeller and the motor to recharge the battery while the housing is stationary relative to the streamer.

6. The cleaning device of claim 1, wherein the controller is configured to control the motor and the propeller to move the housing along the streamer at predetermined time intervals, upon receiving a command, or upon receiving an indication that a cleaning operation is desirable.

7. The cleaning device of claim 6, wherein the indication is generated by a bio-fouling monitoring function.

8. The cleaning device of claim 1, wherein the propeller has foldable blades and the controller is configured to control the propeller to be temporarily folded while the housing is stationary relative to the streamer.

9. The cleaning device of claim 1, further comprising:
a streamer rescue device mounted inside the housing.

10. The cleaning device of claim 1, wherein the housing and a streamer rescue device are mounted on the streamer on opposite sides of one or more ring-type structures.

11. The cleaning device of claim 1, further comprising:
a fastening mechanism configured to affix the housing to the streamer while a cleaning operation is not performed, wherein the controller is configured to actuate the fastening mechanism.

12. The cleaning device of claim 11, wherein the fastening mechanism includes at least one latch.

13. The cleaning device of claim 1, further comprising:
at least one of,
a position sensor connected to the controller and configured to monitor a position of the cleaning device relative to the streamer; and
a transmitter connected to the controller and configured to communicate with surrounding devices mounted on the streamer or on other streamers to enable the controller to determine the position of the cleaning device based on information received from the surrounding devices.

14. The cleaning device of claim 1, wherein the controller is further configured to control a moving speed of the housing along the streamer.

15. A streamer towed underwater to perform a marine seismic surveying, comprising:
a cable-like structure hosting seismic sensors;
positioning devices configured to adjust a depth and a horizontal position of the cable-like structure and mounted at different locations on the cable-like structure; and
one or more cleaning devices attached to the cable-like structure and configured each to clean a respective portion of the cable-like structure, between neighboring positioning devices, wherein at least one cleaning device has (A) a housing attached to the cable-like structure via at least one of brush rings, clamp rings and press wheels, (B) a propeller and (C) a motor configured to rotate the propeller to drive the housing along and relative to the cable-like structure in a towing direction,
wherein the housing is configured to move in a direction opposite to the towing direction along and relative to the streamer due to a water flow caused by towing the streamer underwater.

16. A method for cleaning a portion of a streamer, the method comprising:
mounting a cleaning device on the portion of the streamer, the cleaning device having,
(A) a housing configured to be attached to the streamer via a mechanism including at least one of brush rings, clamp rings and press wheels and to clean the exterior of the streamer when moving along thereof,
(B) a motor mounted inside the housing, and
(C) a propeller connected to be rotated by the motor and sealed outside the housing, the propeller being configured to drive the housing along and relative to the streamer in a towing direction; and
controlling the motor and the propeller to move the cleaning device between a first position at one end of the portion and a second position at an opposite end of the portion in the towing direction.

17. The method of claim 16, wherein the propeller has foldable blades, the method further including:
controlling the propeller to have the blades folded when the housing is stationary relative to the streamer.

18. The method of claim 16, wherein the cleaning device further include a fastening mechanism to affix the housing to the streamer when the cleaning device is stationary relative to the streamer, the method further including
actuating the fastening mechanism.

19. The method of claim 18, wherein the fastening mechanism includes two latches, the actuating including
actuating first a first latch to engage with a first station stopper on the streamer, the first station stopper being located closer to a towing vessel than a second station stopper, and
actuating a second latch to engage the second station stopper.

20. The method of claim 16, wherein the cleaning device further includes a battery connected to the motor and configured to provide power to the motor, and the propeller is foldable, the method further including:
controlling the propeller and the motor to recharge the battery while the housing is stationary relative to the streamer if the battery is not fully charged; and
folding the blades of the propeller while the housing is stationary relative to the streamer if the battery is fully charged.

* * * * *